(12) United States Patent
Chen

(10) Patent No.: US 6,837,151 B2
(45) Date of Patent: Jan. 4, 2005

(54) CONVERTIBLE ROTISSERIE/KEBAB COOKING DEVICE

(76) Inventor: Shane Chen, 1821 NW. 8th Ave., Camas, WA (US) 98607

( * ) Notice: Subject to any disclaimer, the term of this patent is extended or adjusted under 35 U.S.C. 154(b) by 0 days.

(21) Appl. No.: 10/279,375

(22) Filed: Oct. 23, 2002

(65) Prior Publication Data

US 2004/0079239 A1 Apr. 29, 2004

(51) Int. Cl.⁷ .................................................. A47J 37/04
(52) U.S. Cl. ........................ 99/421 H; 99/419; 99/421 R
(58) Field of Search ...................... 99/421 H, 421 HH, 99/419, 421 P, 421 R

(56) References Cited

U.S. PATENT DOCUMENTS

| | | | |
|---|---|---|---|
| 3,169,470 A | | 2/1965 | Oatley |
| 3,858,495 A | * | 1/1975 | Gotwalt .................... 99/421 H |
| 4,078,478 A | * | 3/1978 | Geisel ...................... 99/421 P |
| 5,333,540 A | * | 8/1994 | Mazzocchi ............... 99/421 H |
| 5,782,168 A | * | 7/1998 | Krhnak ...................... 99/340 |
| 6,035,768 A | * | 3/2000 | Kaufman .................... 99/449 |
| 6,047,633 A | | 4/2000 | Khaytman |
| 6,253,665 B1 | | 7/2001 | Backus et al. |

FOREIGN PATENT DOCUMENTS

FR   2668354   *   4/1992   ............. 99/421 H

* cited by examiner

*Primary Examiner*—Reginald L. Alexander
(74) *Attorney, Agent, or Firm*—Steven J. Adamson

(57) ABSTRACT

The present invention provides a cooking device that is convertible between a rotisserie cooking device and a kebab cooking device, folds up for compact storage, uses the heat element and enclosure of a conventional oven, and is inexpensive to manufacture.

26 Claims, 7 Drawing Sheets

US 6,837,151 B2

CONVERTIBLE ROTISSERIE/KEBAB COOKING DEVICE

TECHNICAL FIELD

The present invention relates to a cooking device and, more particularly, to a cooking device that is convertible for use as both a rotisserie and a kebab cooking device in a conventional oven.

BACKGROUND OF THE INVENTION

Rotisserie ovens are popular for roasting chickens and the like because the slow, even turning of the chicken results in a tender and juicy bird with a crispy skin on every side. However, rotisserie ovens typically are self-contained such that the oven includes its own heat source and enclosure. Accordingly, these ovens are generally bulky to store and expensive to purchase. For these reasons, rotisserie ovens typically are used only in commercial establishments or as a luxury item in residential households having the needed storage space and income to purchase such one-time use items.

Accordingly, there is a need for a rotisserie cooking device that is easy to store and inexpensive to manufacture. Moreover, there is a need for a rotisserie device that may be used for other cooking functions so that the initial purchase of the device may be justified as a non-luxury cooking item.

SUMMARY OF THE INVENTION

An object of the present invention, therefore, is to provide a rotisserie cooking device that is easy to store.

A further object of the present invention is to provide a rotisserie cooking device that is inexpensive to manufacture.

Another object of the present invention is to provide a rotisserie cooking device that may be used for other cooking functions.

The present invention provides a cooking device that is convertible between a rotisserie cooking device and a kebab cooking device, folds up for compact storage, uses the heat element and enclosure of a conventional oven, and is inexpensive to manufacture.

DETAILED DESCRIPTION OF THE PREFERRED EMBODIMENTS

Figure 1:
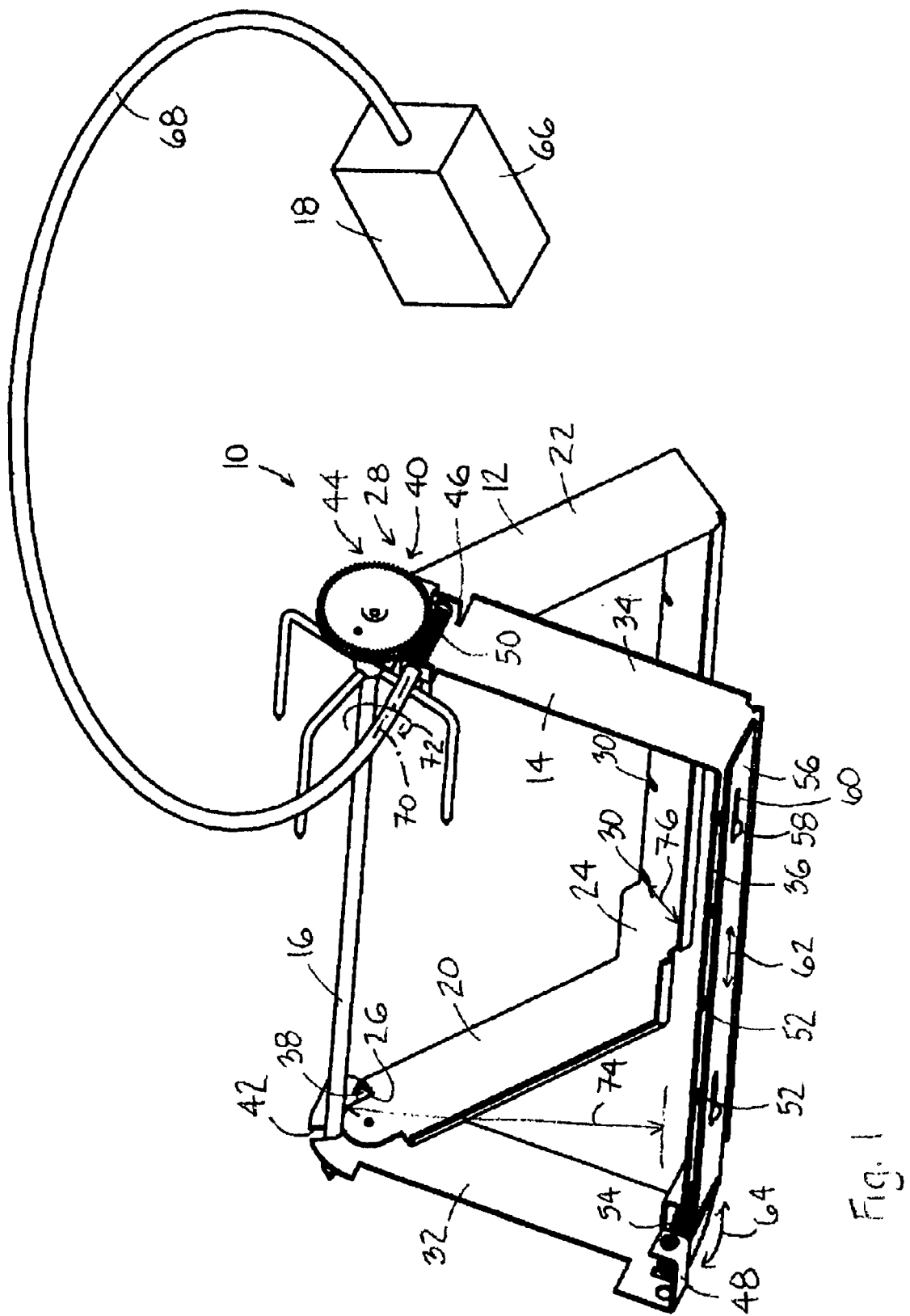
FIG. 1 is an isometric view of the cooking device of the present invention in the rotisserie cooking configuration.

FIG. 1 is an isometric view of the cooking device of the present invention in the rotisserie cooking configuration. In particular, cooking device 10 comprises a first base portion 12, a second base portion 14, a rotisserie spit or skewer 16 and a power device 18. First base portion 12 comprises first 20 and second 22 legs and a crossbar 24 extending there between. First leg 20 and second leg 22 each including a notch 26 and 28 (in this view notch 28 is hidden by skewer 16 but the notch is a mirror image of notch 26 on first leg 20), respectively, described in more detail below, for locking the cooking device in the rotisserie configuration, as shown. Crossbar 24 includes a plurality of recesses 30 adapted for each receiving a shish kabab skewer (not shown) therein.

Second base portion 14 comprises first 32 and second 34 legs and a cross bar 36 extending there between. First leg 32 and second leg 34 each include a projection 38 and 40 (in this view projection 40 is hidden by skewer 16 but the projection is a mirror image of projection 38 on first leg 32), respectively, described in more detail below, for mating with notches 26 and 28, respectively, for locking the cooking device in the rotisserie configuration. First and second legs 32 and 34 further include recesses 42 and 44 (in this view recess 44 is hidden by skewer 16 but the recess is a mirror image of recess 42 on first leg 32), respectively, for supporting rotisserie skewer 16 therein. In this embodiment, recesses 42 and 44 are the same size. However, in other embodiments, recess 42 may be smaller in size than recess 44 such that skewer 16 may be supported by the recesses in only one orientation such that power device 18 will contact a sprocket end of skewer 16, as will be described in more detail below.

Second base portion 14 further includes a rotisserie bracket 46 on second leg 34 and a kebab bracket 48 on first leg 32, each for supporting a worm gear 50. In the configuration shown, worm gear 50 is positioned within rotisserie bracket 46 and kebab bracket 48 remains empty. Cross bar 36 of second base portion 14 includes a plurality of recesses 52, a sprocket 54 and a movable kebab plate gear 56, as will be described in more detail below. Kebab plate gear 56 is secured to crossbar 36 by fasteners 58 received within slots 60 of the gear plate such that the kebab gear plate 56 is movable along axis 62 with respect to crossbar 36. Sprocket 54 is secured to crossbar 36 so that the sprocket may rotate on crossbar 36 in directions 64. In the embodiment shown, recesses 30 of first base portion 12 are smaller in size than recesses 52 of second base portion 14 such that kebab skewers (shown in FIG. 5) may be supported by the recesses in only one orientation, as will be described in more detail below.

Power device 18 typically includes a motor 66 connected to a shaft 68, such as a cable, which is in turn connected to worm gear 50. Shaft 68 typically comprises a flexible, heat resistant cable such that the cable may be threaded through the slightly open door of a conventional oven or barbecue during cooking. Activation of motor 66 will rotate worm gear 50 about its axis 70 in a direction 72, which may be accomplished by any means known to those skilled in the art. Power device 18 may be battery operated, as shown, or may include a power cable (not shown) for connecting motor 66 to a standard plug-in power receptacle, such as a 110 volt duplex outlet (not shown). Cable 68 may be of any length as is desired, but typically will have a length sufficient such that base portions 12 and 14, and skewer 16, can be placed within the heated enclosure of a conventional oven with the cable extending out of the oven enclosure, or a barbecue enclosure, through the slightly ajar oven door (not shown). Those skilled in art will understand that during use of the rotisserie cooking device, the conventional oven heating element will typically will be set to "broil" and the door to the conventional oven enclosure may be purposefully left ajar for circulation reasons such that passage of the motor cable of the present invention through the slightly ajar door does not interfere with such rotisserie cooking. In this manner, motor 66 can be placed on top of the oven, outside of the heated enclosure of the oven, while allowing food placed on the skewers to be heated by the oven. Accordingly, cooking device 20 allows one to use the heating element and the large enclosure of a convention oven such that cooking device 20 may be manufactured in a compact size, and at a relatively inexpensive cost.

In this rotisserie cooking configuration, rotisserie spit 16 is supported above crossbars 24 and 36 at a height 74 such that there is sufficient room for turning of a chicken on spit 16 without the chicken contacting the crossbars 24 or 36, or the flat surface on which the crossbars are supported.

Figure 2:
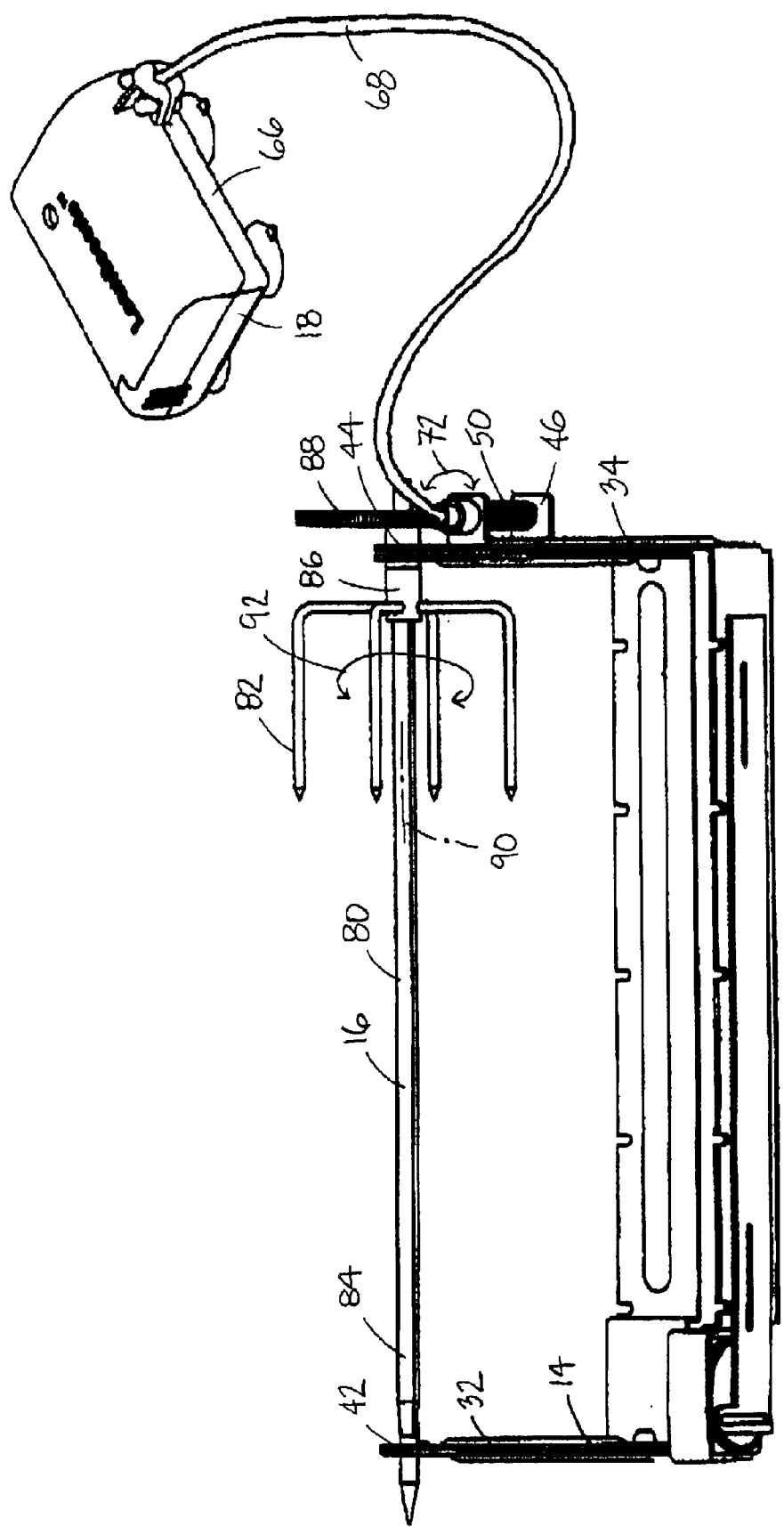
FIG. 2 is a second isometric view of the cooking device of FIG. 1.

FIG. 2 is a second isometric view of the cooking device of FIG. 1. Spit 16 includes an elongate central skewer 80 and four shorter outer skewers 82. A first end 84 of central skewer 80 is received within recess 42 of leg 32 of second base portion 14 and a second end 86 of central skewer 80 is received within recess 44 of leg 34 of second base portion 14. In this configuration, a sprocket 88 of skewer 16 mates with worm gear 50 retained within bracket 46 such that rotation of worm gear 50 in direction 72 will result in rotation of sprocket 88 about its central axis 90 in a direction 92 (more clearly shown in FIG. 1). Skewers 80 and 82 are secured to sprocket 88 such that rotation of sprocket 88 in direction 92 will result in rotation of skewers 80 and 82 in direction 92. Accordingly, a chicken or other roasting food secured to central skewer 80 and outer skewers 82 will rotate in direction 92 about central axis 90 of spit 16. In this manner, the food secured to spit 16 will be evenly roasted within the heated enclosure of a conventional oven.

Figure 3:
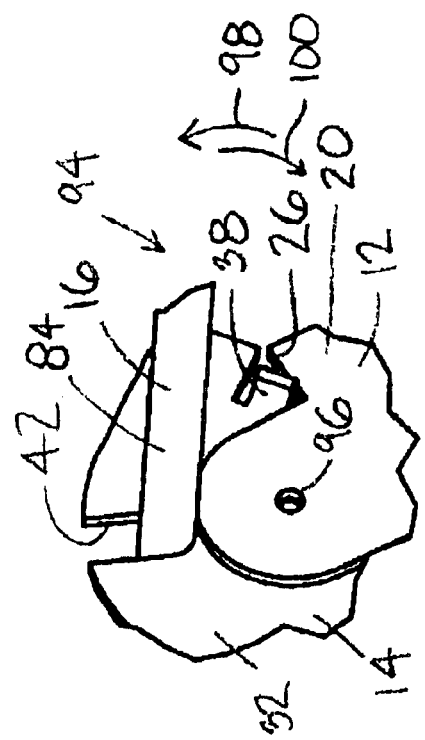
FIG. 3 is a detailed view of the rotisserie locking device.

FIG. 3 is a detailed view of the rotisserie locking device of FIG. 1. Locking device 94 comprises notch 26 of first leg 20 of first base portion 12 and projection 38 of first leg 32 of second base portion 14. First leg 20 is secured to first leg 32 by a fastener 96 such that legs 20 and 32 may pivot about fastener 96. When the cooking device is placed on a flat surface (not shown), the weight of gravity will tend to force first leg 20 to rotate in direction 98 and will tend to force first leg 32 to rotate in direction 100. In this manner, projection 38 is secured with notch 26, thereby stabilizing the cooking device. Second leg 22 and second leg 34 are connected to one another in a mirror image manner to that shown in the detail view of FIG. 3. Accordingly, the cooking device is stable in the rotisserie configuration, as shown, by projections 38 and 40 which are received within notches 26 and 28, respectively. To collapse or fold the cooking device, the cooking device is lifted from the flat surface on which it rests, such that leg 20 may be moved in direction 100 about fastener 96 and leg 32 may be moved in direction 98 about fastener 96, as will be described in more detail below.

Figure 4:
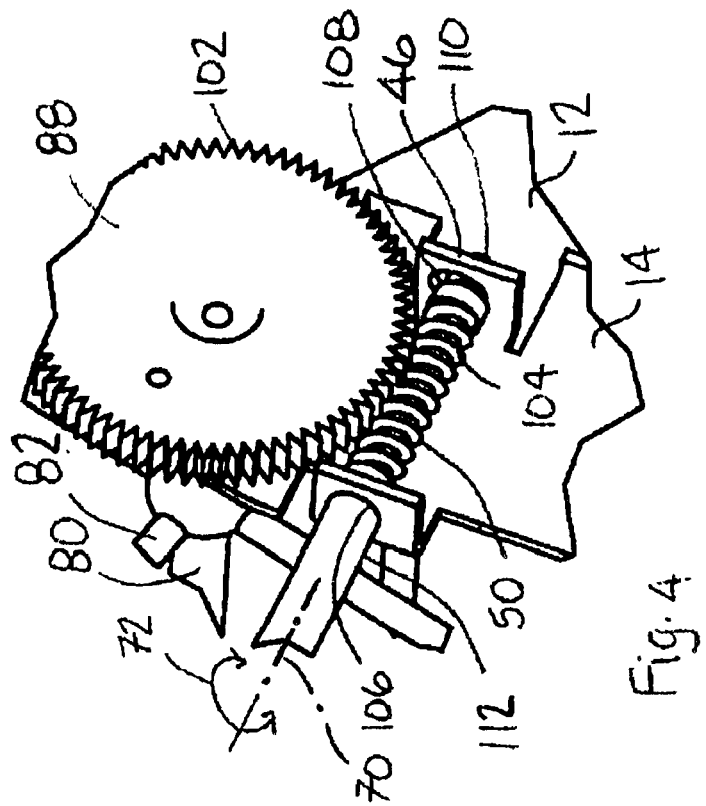
FIG. 4 is a detailed view of the rotisserie turning device.

FIG. 4 is a detailed view of the rotisserie turning device. In particular, sprocket 88 is shown having teeth 102 that mate with raised helical projections 104 of worm gear 50. Bracket 46 includes a first aperture 106 and a second aperture 108, wherein second aperture 108 typically is smaller than first aperture 106. Worm gear 50 typically includes a first end 110 region having a diameter that is smaller than the diameter of helical projections 104. Accordingly, worm gear 50 is secured within bracket 46 wherein first end 110 is received within second aperture 108 and a second end region 112, having a diameter similar to that of raised helical projections 104, is received within first aperture 106 of bracket 46. The worm gear is rotationally secured within bracket 46 such that worm gear 50 may be rotated in direction 72 about its axis 70 by motor 66 (shown in FIG. 1).

Figure 5:
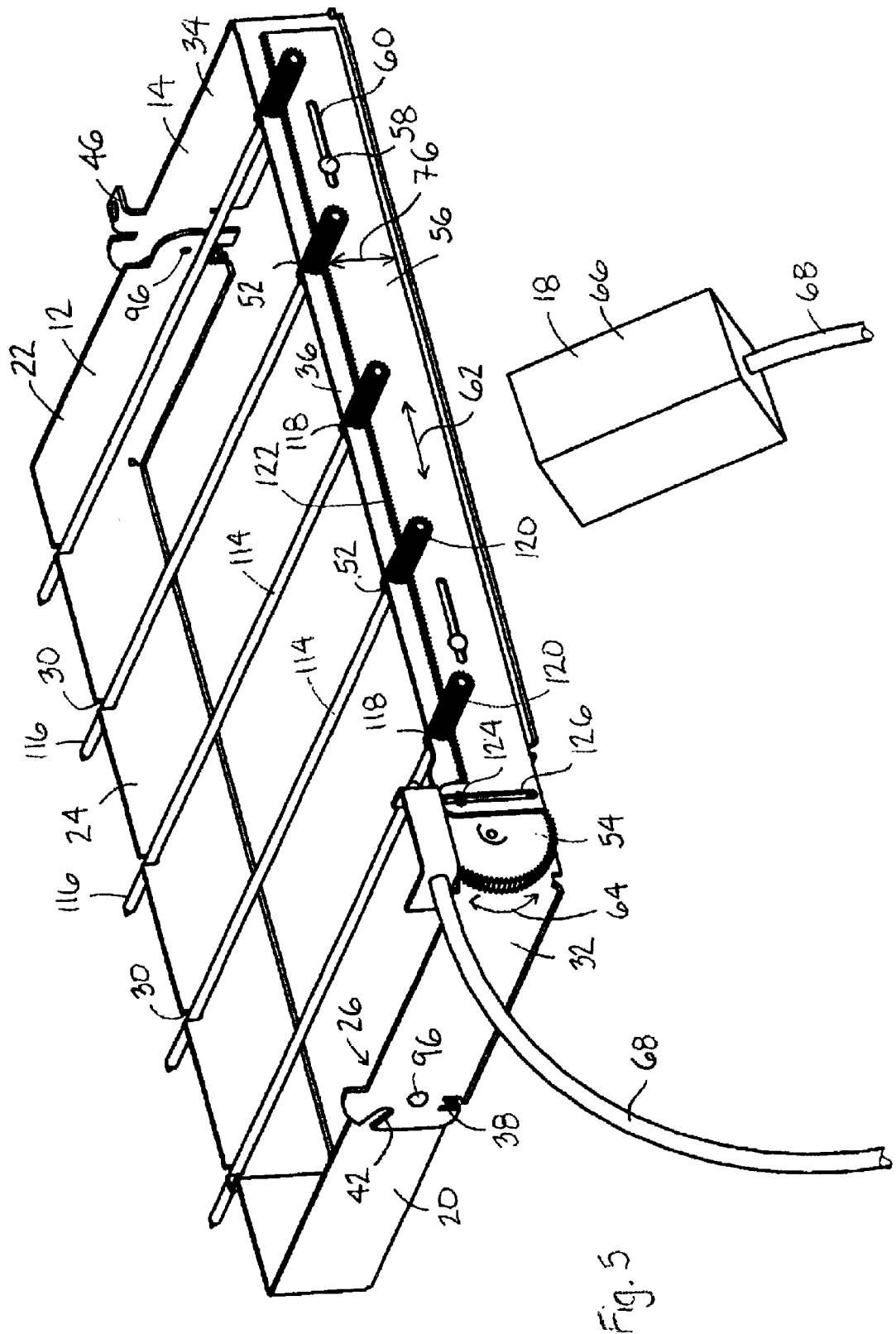
FIG. 5 an isometric view of the cooking device of the present invention in the kebab cooking configuration.

FIG. 5 an isometric view of the cooking device of the present invention in the kebab cooking configuration. In this configuration, first base portion 12 and second base portion 14 have been rotated about fasteners 96 such that the base portions extend away from one another and lie in the same plane. Accordingly, cooking device 20 may be placed on a flat surface wherein the flat surface supports the cooking device in this flat, kebab cooking configuration. In this kebab cooking configuration, rotisserie spit 16 has been removed and kebab skewers 114 have been placed in corresponding sets of recesses 30 on crossbar portion 24, and recesses 52 on crossbar portion 36. Each of kebab skewers 114 include a first end region 116 having a diameter sized to be received within an aperture 30 of first base portion 12 and a second end region 118 having a diameter slightly larger than first end region 116, and sized to be received within an aperture 52 of second base portion 14. In this manner, a sprocket portion 120 of each kebab skewer 114 will be positioned in contact with the teeth 122 of kebab plate gear 56.

In the kebab cooking configuration, worm gear 50 is removed from rotisserie bracket 46 and is placed in kebab bracket 48. Bracket 48 includes first and second apertures 106 and 108, similar in diameter to the apertures of bracket 46 such that worm gear 50 is secured within bracket 48 in the same manner that the worm gear is secured within bracket 46. When positioned within bracket 46, worm gear 50 mates with sprocket 54 which in turn is operatively connected to kebab plate gear 56 by a pin 124 that is received within a slot 126 of plate gear 56.

In this kebab cooking configuration, kebab skewers 114 are supported on crossbars 24 and 36 at a height 76 above the surface that supports the crossbars 24 and 36. Height 76 of kebab skewers 114 above the support surface is much less than height 74 of rotisserie spit 16 in the rotisserie configuration of the cooking device (shown in FIG. 1). However, small pieces of meat and/or vegetables typically are cooked on shish kebab skewers 114 such that height 76 is sufficient for turning of the small pieces of meat and/or vegetables without the meat for vegetables contacting the support surface. In the embodiment shown, height 74 typically is approximately 6.0 inches whereas height 76 is approximately 1.5 inches. Accordingly, height 74 typically is approximately five times greater than height 76.

Figure 6:
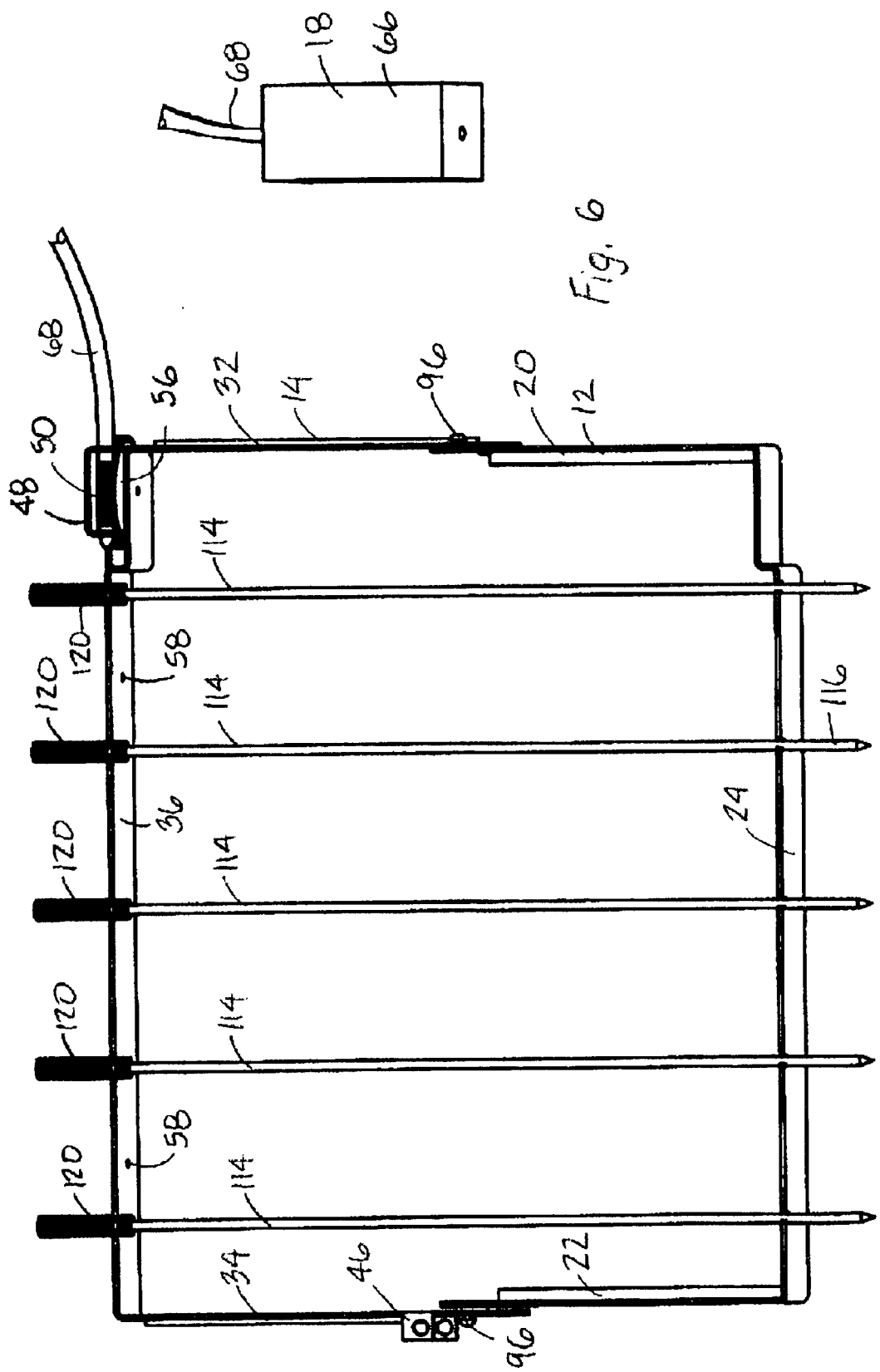
FIG. 6 is top view of the cooking device of FIG. 5.

FIG. 6 is top view of the cooking device of FIG. 5, showing worm gear 50 in contact with sprocket 54 and five kebab skewers 114 positioned on base portions 12 and 14. Each of the five kebab skewers 114 includes a sprocket portion 120 in contact with the teeth 122 of plate gear 56.

Figure 7:
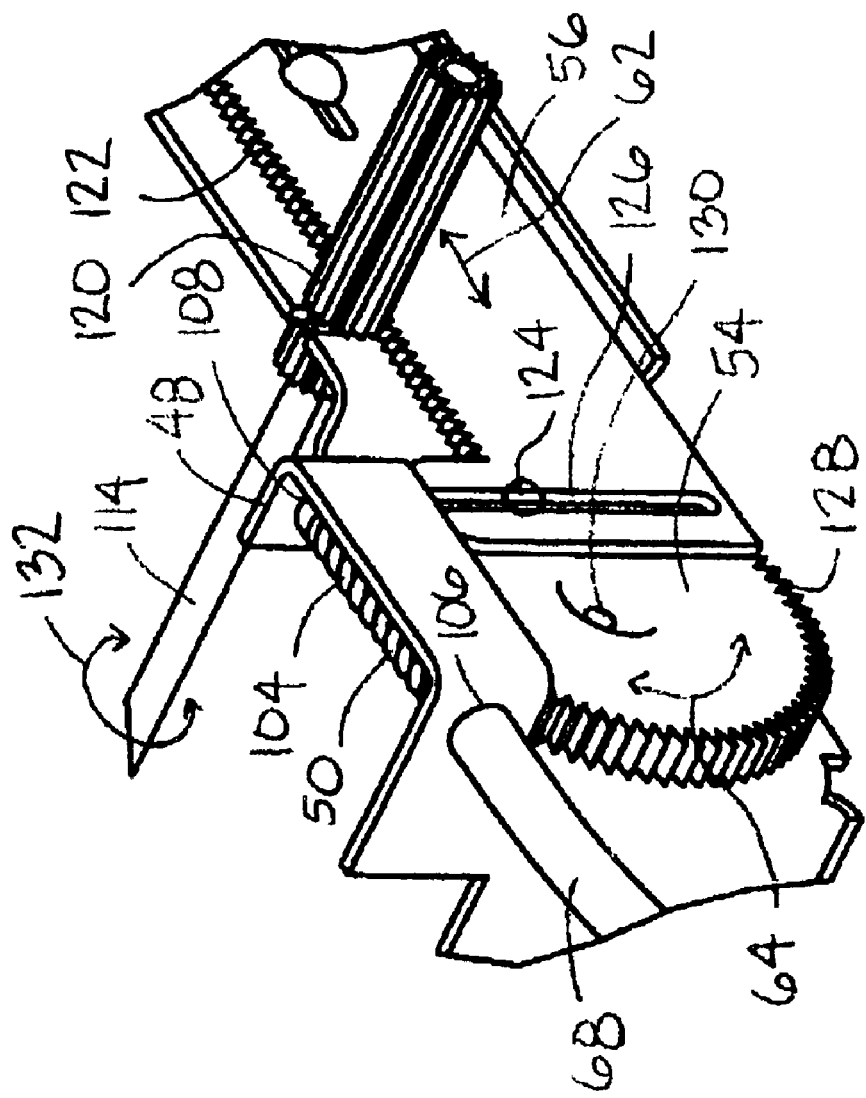
FIG. 7 is a detailed view of the kebab turning device.

FIG. 7 is a detailed view of the kebab turning device. In particular, raised helical projections 104 of worm gear 50 are positioned within bracket 48 such that the projections 104 contact the teeth 128 of sprocket 54. Motor 66 causes worm gear 50 to rotate in direction 72 about its axis 70 such that raised projections 104 cause sprocket 54 to turn about fastener 130 in direction 64, wherein fastener 130 secures the sprocket 54 to second base portion 14. Rotation of sprocket 54 in direction 64 will cause pin 124, secured to sprocket 54, to also rotate in direction 64. Rotation of pin 124 in direction 64, by the positioning of pin 124 within slot 126, will cause kebab plate gear to move in direction 62. Accordingly, activation of motor 66 will cause the plate gear to move in direction 62 which, due to the mating connection of teeth 122 of plate gear 56 and sprocket 120 of skewers 114, will cause skewers 114 to rotate in a direction 132. Those skilled in the art will understand that sprocket 54 may rotate counter-clockwise, or clockwise, and still result in movement of plate gear 56 in direction 62.

Due to the similar configuration of rotisserie bracket 46 and kebab bracket 48, a single worm gear 50 and a single motor 66 may be used interchangeably within the two brackets to rotate either rotisserie spit 16 or the set of kebab skewers 114. This versatility of cooking device 20 allows multiple functions of the device while retaining the cost of the device in a price range that is reasonable for many consumers. Accordingly, the device is multi-functional, i.e., the device may be used as a rotisserie cooker or a kebab cooker, wherein the motor, placed outside the heated enclosure of a conventional oven, rotates the skewers for even cooking.

Figure 8:
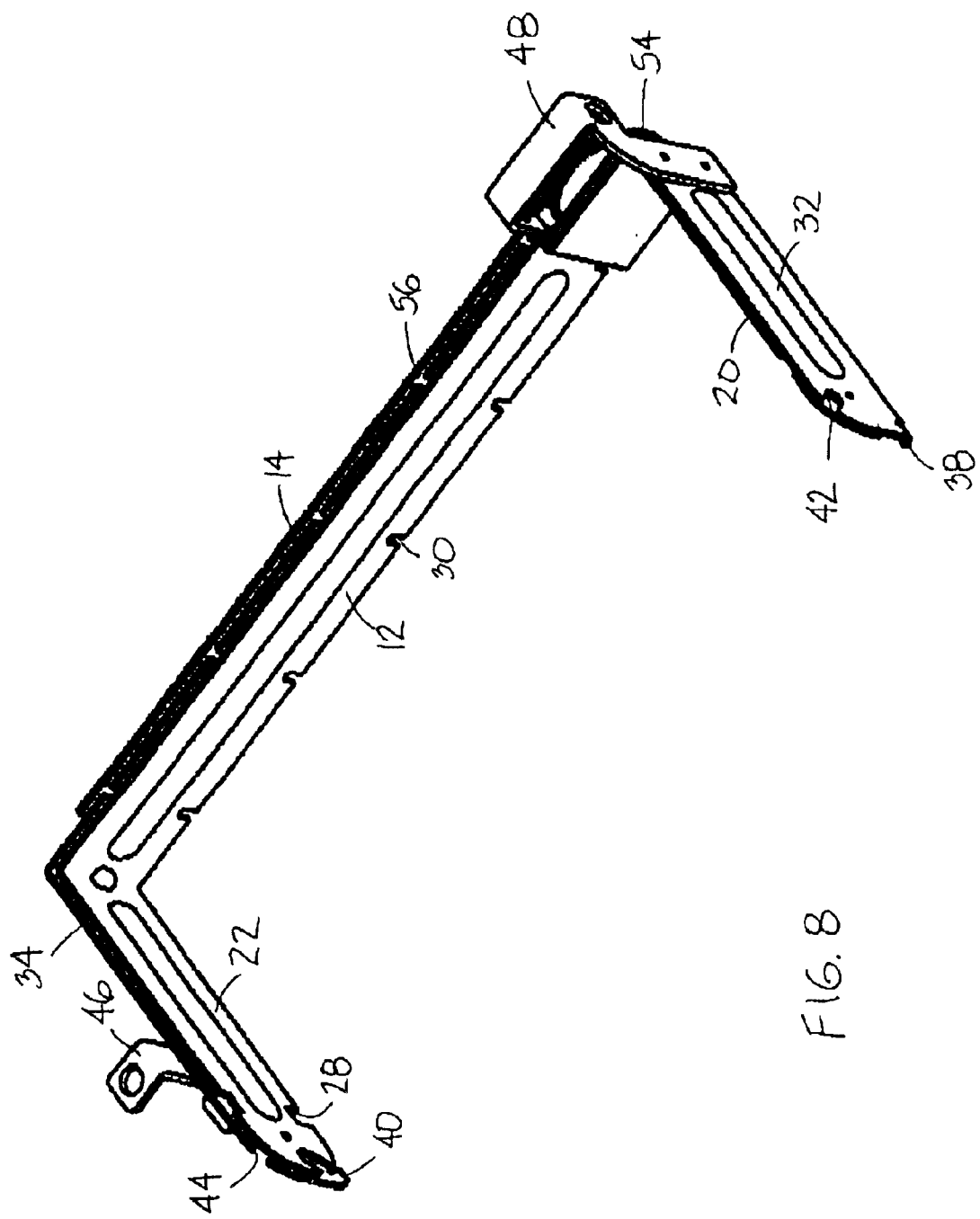
FIG. 8 is an isometric view of the cooking device folded for storage.

FIG. 8 is an isometric view of the cooking device folded for storage. In this folded configuration first base portion 12 fits adjacent to and interior of second base portion 14. Accordingly, the device folds into a compact space occupying approximately half the space required for the kebab configuration shown in FIG. 6. In this folded configuration, the cooking device 20 may easily be placed within a kitchen drawer for storage when not in use. The cooking device of the present invention, therefore, requires much less space to store than a rotisserie device that includes its own heating element and its own enclosure for surrounding the food being cooked. Due to the small size of the device and the lack of any electronic parts (when motor 66 is removed from connection to the base portions 12 and 14) the base portions of the cooking device may be washed in a conventional dishwasher. Moreover, due to the relatively small amount of material used to fabricate the cooking device, typically a heat resistant metal such as iron or steel which may be nickel or chrome coated for a shiny appearance, the cooking device can be fabricated at a relatively inexpensive cost.

In the above description numerous details have been set forth in order to provide a more through understanding of the present invention. It will be obvious, however, to one skilled in the art that the present invention may be practiced using other equivalent designs.

I claim:

1. A cooking device comprising:
a first base portion;
a second base portion movably connected to said first base portion;
said first base portion and said second base portion being adapted for relative movement with respect to each other between a rotisserie cooking configuration and a kebab cooking configuration; and
a rotisserie skewer and a kebab skewer;
wherein in said rotisserie cooking configuration said rotisserie skewer is positioned above a support surface by a first distance, wherein in said kebab cooking configuration said kebab skewer is positioned above a support surface by a second distance, and wherein said first distance is greater than said second distance.

2. The cooking device of claim 1 further comprising a sprocket and a plate gear each operatively connected to said second base portion, wherein rotation of said sprocket on said second base portion causes linear movement of said plate gear on said second base portion.

3. The cooking device of claim 1 further comprising a motor positioned at a remote location from said first and second base portions, said motor operatively connected to said second base portion by a flexible, heat resistance shaft.

4. The cooking device of claim 2 further comprising a motor positioned at a remote location from said first and second base portions and a worm gear operatively connected to said flexible shaft, said worm gear adapted to mate with said sprocket and to cause rotation thereof.

5. The cooking device of claim 4 further comprising a kebab skewer supported in said kebab cooking orientation by said first and second base portions, said kebab skewer mating with said plate gear such that linear movement of said plate gear causes rotational movement of said skewer on said first and second base portions.

6. The cooking device of claim 1 further comprising a rotisserie skewer including a sprocket, and a motor device including a worm gear adapted for securement to said second base portion, said rotisserie skewer supported by said second base portion such that said sprocket mates with said worm gear wherein rotation of said worm gear causes rotation of said sprocket on said second base portion.

7. The cooking device of claim 1 wherein said second base portion is pivotally connected to said first base portion.

8. The cooking device of claim 1 wherein said first base portion includes a notch and said second base portion includes a projection, and wherein said projection is received in said notch to secure said cooking device in the rotisserie cooking configuration.

9. The cooking device of claim 1 wherein said second base portion includes a pair of recesses for supporting a rotisserie skewer therein.

10. The cooking device of claim 1 wherein said first base portion includes a first recess, said second base portion includes a second recesses, and wherein said first and second recesses are adapted for supporting a kebab skewer therein.

11. The cooking device of claim 1 wherein said first and second base portions are adapted for relative movement with respect to each other into a folded orientation wherein in said folded orientation said first base portion is positioned adjacent to and interior of said second base portion.

12. The cooking device of claim 1 wherein said second base portion includes first and second brackets, said first bracket adapted for supporting a worm gear therein when said cooking device is in said rotisserie cooking configuration, and said second bracket adapted for supporting a worm gear therein when said cooking device is in a kebab cooking configuration.

13. The cooking device of claim 2 wherein said plate gear includes a slot and said sprocket includes a pin received within said slot such that rotation of said sprocket causes sliding movement of said pin within said slot.

14. A rotisserie cooking device for use adjacent a heat source, comprising:
a base; and
a motor positioned at a remote location from said base and operatively connected thereto by a heat resistant shaft;
wherein said base comprises a first base portion and a second base portion movably connected to said first base portion; and
wherein said first and second base portions are adapted for movement between a folded storage orientation, a rotisserie cooking orientation, and a kebab cooking orientation.

15. The cooking device of claim 14 further comprising:
a worm gear connected to said shaft; and
a skewer including a sprocket;
wherein said motor is adapted for rotating said shaft and said worm gear, and
wherein rotation of said worm gear causes rotation of said sprocket and said skewer.

16. The cooking device of claim 14 wherein said second base portion is pivotally connected to said first base portion.

17. The cooking device of claim 14 wherein said base includes a first bracket adapted for removably supporting said worm gear, and a second bracket adapted for removably supporting said worm gear, wherein said worm gear is positioned in said first bracket in said rotisserie cooking orientation and said worm gear is positioned in said second bracket in said kebab cooking orientation.

18. A combination rotisserie/kebab cooking device, comprising:
   a base including a first bracket, a second bracket, a first base portion and a second base portion pivotally movable with respect to said first base portion between a rotisserie cooking position and a kebab cooking position;
   a motor positioned at a location remote from said base; and
   a gear operatively connected to said motor and adapted for removable securement within said first bracket when said second base portion is in said rotisserie cooking position and adapted for removable securement within said second bracket when said second base portion is in said kebab cooking position.

19. The cooking device of claim 18 further comprising a heat resistant, flexible shaft that connects said motor and said gear such that when said base is positioned within a heated enclosure of a conventional oven, said motor is positioned outside said heated enclosure.

20. A cooking device comprising:
   a first base portion;
   a second base portion movably connected to said first base portion;
   said first base portion and said second base portion being adapted for relative movement with respect to each other between a rotisserie cooking configuration and a kebab cooking configuration; and
   a sprocket and a plate gear each operatively connected to said second base portion, wherein rotation of said sprocket on said second base portion causes linear movement of said plate gear on said second base portion.

21. A cooking device comprising:
   a first base portion;
   a second base portion movably connected to said first base portion;
   said first base portion and said second base portion being adapted for relative movement with respect to each other between a rotisserie cooking configuration and a kebab cooking configuration; and
   a rotisserie skewer including a sprocket, and a motor device including a worm gear adapted for securement to said second base portion, said rotisserie skewer supported by said second base portion such that said sprocket mates with said worm gear wherein rotation of said worm gear causes rotation of said sprocket on said second base portion.

22. A convertible device for holding and moving a food item during cooking, comprising:
   base movable between a first cooking position and a second cooking position, said second cooking position being different from said first cooking position; and
   a motor located remotely from said base and having a flexible drive mechanism;
   wherein said flexible drive mechanism is releasably coupleable to said base at a first location and adapted for turning a first food holding member when coupled at said first location and is releasably coupleable to said base at a second location and adapted for turning a second food holding member when coupled at said second location.

23. The device of claim 22, wherein said flexible drive mechanism includes a flexible cable.

24. The device of claim 22, wherein said flexible drive mechanism is readily flexible in three mutually orthogonal directions.

25. A device for holding and moving a food item during cooking, comprising:
   a base frame that has a member configured to hold a food item during cooking;
   a motor located remotely from said base frame; and
   a flexible drive mechanism releasably coupled between said motor and said base frame that drives movement of said food item holding member;
   wherein said base frame and said motor are arranged in a non-fixed physical arrangement with respect to one another such that, in cooperation with said flexible drive mechanism, one of said base frame and said motor may be physically displaced without moving the other; and
   wherein said flexible drive mechanism is readily flexible in three mutually orthogonal directions in affecting a physical displacement of one of said base frame and said motor relative to the other.

26. The device of claim 25, wherein said base frame is convertible between a first cooking position and a second cooking position, different from said first position.

* * * * *